United States Patent
DePrisco et al.

(10) Patent No.: US 6,331,691 B1
(45) Date of Patent: Dec. 18, 2001

(54) PRECISION GUIDING APPARATUS FOR LASER MARKING SYSTEM

(75) Inventors: Joseph DePrisco, Fort Wayne; Brad Good, Columbia City; Kermit Hogeston; Brent Lahey, both of Churubusco, all of IN (US)

(73) Assignee: Automated Laser Corporation, Huntertown, IN (US)

( * ) Notice: Subject to any disclaimer, the term of this patent is extended or adjusted under 35 U.S.C. 154(b) by 0 days.

(21) Appl. No.: 09/399,614

(22) Filed: Sep. 20, 1999

(51) Int. Cl.$^7$ .................................................. B23K 26/00
(52) U.S. Cl. ................................ 219/121.68; 219/121.79
(58) Field of Search ...................... 219/121.68, 121.69, 219/121.74, 121.78, 121.79, 121.8, 121.81; 372/14; 425/174.4

(56) References Cited

U.S. PATENT DOCUMENTS

| 210,646 | 12/1878 | Tornquist . | |
|---|---|---|---|
| 248,476 | 10/1881 | King . | |
| 2,010,965 | 8/1935 | Scrivener . | |
| 2,239,986 | 4/1941 | Blood . | |
| 3,953,706 | * 4/1976 | Harris et al. | 219/121.68 |
| 4,605,320 | 8/1986 | Gossner . | |
| 4,695,698 | * 9/1987 | Mayor et al. | 219/121.6 |
| 5,157,235 | * 10/1992 | Okumura et al. | 219/121.68 |
| 5,575,936 | * 11/1996 | Goldfarb | 219/121.68 |
| 5,593,606 | * 1/1997 | Owen et al. | 219/121.71 |
| 5,613,782 | 3/1997 | Korting et al. . | |
| 5,658,475 | * 8/1997 | Barenboim et al. | 219/121.77 |
| 5,734,412 | * 3/1998 | Hasebe et al. | 347/247 |
| 5,821,497 | 10/1998 | Yamazaki et al. . | |
| 6,064,034 | * 5/2000 | Rieck | 219/121.85 |

* cited by examiner

Primary Examiner—Samuel M. Heinrich
(74) Attorney, Agent, or Firm—Randall J. Knuth

(57) ABSTRACT

An x-y axis guiding apparatus is utilized as the guiding mechanism for a laser marking device. Wear compensating bearings are utilized in conjunction with the x-y axis guiding apparatus so that the gaps between the bearings and the guide components which occur as the bearings wear is taken up and the desired precision maintained.

16 Claims, 4 Drawing Sheets

PRECISION GUIDING APPARATUS FOR LASER MARKING SYSTEM

BACKGROUND OF THE INVENTION

1. Field of the Invention

The present invention relates to a laser marking device which utilizes an x-y axis guiding system. Wear compensating bearings are utilized with the x-y axis guiding apparatus to provide the required precision for a laser marking device.

2. Description of the Related Art

Laser marking devices are useful to mark serial numbers, trademarks, logos, etc. These markings are made on a variety of workpieces or products including those made from anodized or painted metal, quartz or ceramics.

Laser marking devices are commonly utilized to create small and precise marks. Since the marks created by laser marking devices are generally small in size, the system for guiding the laser must be very precise to create a legible mark. Galvo systems are commonly utilized to achieve the required precision guiding in laser marking devices. The galvo guiding systems currently used in the art are very expensive to manufacture and, therefore, laser marking devices utilizing such guiding systems are very expensive.

What is needed in the art is a laser marking device which has a precision guiding apparatus and which is less expensive to manufacture than the currently available guiding systems.

SUMMARY OF THE INVENTION

The present invention is directed to improve upon the currently available laser marking devices, wherein it is desired to provide a laser marking apparatus which can precisely guide a marking laser beam and is less expensive than the currently available guiding systems.

The present invention provides a laser marking device which utilizes an x-y axis guiding system to position the marking laser beam along the desired marking path. To achieve the desired precision, wear compensating bearings are utilized in conjunction with the x-y axis guiding system. X-y axis guiding systems are much more cost effective than the galvo guiding systems currently utilized. The wear compensating bearings utilized in conjunction with the x-y axis guiding system utilize tension elements to reduce the inherent gaps between the bearing and the guide created as the bearing wears, while maintaining operative relationship between the guide and the guided part. Such system maintains the center line of the bearing colinear with the center line of shaft about which the bearing surrounds utilizing an application of a radially inward directed compressive force or load.

The invention, in one form thereof, comprises a laser marking apparatus for marking the workpiece, wherein the laser beam is operable to travel in a coordinate system which includes an x-axis, a y-axis, and a z-axis. The apparatus of this form of the current invention includes a laser source which is operative to produce a laser beam which travels substantially along the z-axis as it exits the laser source. An x-y axis guiding apparatus is utilized to guide the laser beam. The x-y axis guiding apparatus is moveable along the x-axis and the y-axis and such movement of the x-y axis guiding apparatus is operative to move the laser beam. The laser source can be, for example, without limitation, a $CO_2$, YAG, or Pulsed Diode laser source.

In one form of the current invention, the x-y axis guiding apparatus includes a first reflective surface which is operably positioned to redirect the laser beam so that it travels substantially along the x-axis. A second reflective surface is operably positioned to redirect the laser beam after the laser beam has been redirected by the first reflective surface. The second reflective surface redirects the laser beam so that it travels substantially along the y-axis. A third reflective surface is utilized to further redirect the laser beam as the laser beam travels substantially along the y-axis. The third reflective surface redirects the laser beam so that it travels substantially along the z-axis.

In one form of the current invention, the second reflective surface is affixed to a first guide component while the third reflective surface is affixed to a second guide component. An x-axis guide shaft and a y-axis guide shaft as well as an x-axis actuator and a y-axis actuator are provided. The x-axis and y-axis actuators can be, for example, ball screws, precision timing belts, or cable drive actuators. The x-axis ball screw and the y-axis ball screw are substantially parallel to the x-axis guide shaft and the y-axis guide shaft, respectively. The first guide component is operably connected to the x-axis guide shaft for movement therealong. The first guide component is additionally operably connected to the x-axis ball screw. Similarly, the second guide component is operably connected to the y-axis guide shaft for movement therealong and is operably connected to the y-axis ball screw. The y-axis guide shaft and the y-axis ball screw are both affixed to the first guide component so that movement of the first guide component moves both the y-axis guide shaft and the y-axis ball screw. The x-axis guide shaft and the y-axis guide shaft can be, for example, polished stainless steel shafts.

A first bearing is positioned between the x-axis guide shaft and the first guide component, while a second bearing is positioned between the y-axis guide shaft and the second guide component. The first bearing and the second bearing are operative to allow relative movement between the x-axis guide shaft and the first guide component and the y-axis guide shaft and second guide component, respectively.

In one form of the current invention, a first drive means is operably connected to the x-axis ball screw and is operative to actuate the x-axis ball screw. Actuation of the x-axis ball screw actuates the first guide component in the x-direction. Similarly, a second drive means is operably connected to the y-axis ball screw. The second drive means is operative to actuate the y-axis ball screw, whereby actuation of the y-axis ball screw actuates the second guide component in the y-direction. The first drive means and second drive means can be, for example, a first stepper motor and a second stepper motor, respectively.

In one form of the current invention, a computational device is communicatively connected to a first stepper motor and a second stepper motor. The computational device is operative to control both the first stepper motor and the second stepper motor and, therefore, to control the markings made by the laser.

In one form of the current invention, a first biasing means is operatively connected to the first bearing and is operative to maintain the first bearing in operative relationship with the x-axis guide shaft while the first bearing maintains its operative relationship with the first guide component. Similarly, a second biasing means is operatively connected to the second bearing and is operative to maintain the second bearing in operative relationship with the y-axis guide shaft while the second bearing maintains its operative relationship with the second guide component. The first and second biasing means can be, for example, an annular spring or any of various known elastic members.

The invention, in another form thereof, comprises a precision guiding apparatus which includes a guide shaft and a guide component. The guide component is operably connected to the guide shaft for movement therealong. A bearing is provided and is operative to allow relative movement between the guide shaft and the guide component. Biasing means surround the bearing always centering the bearing about the guide shaft. The biasing means can be, for example, an annular spring.

The invention, in another form thereof, comprises a laser marking apparatus for marking a workpiece with a laser beam. The laser beam is operable to travel in a coordinate system which includes an x-axis, a y-axis, and a z-axis. A laser source is operative to produce a $CO_2$ laser beam which travels substantially along the z-axis from the laser source. A first reflective surface is operably positioned to redirect the laser beam so that the laser beam travels substantially along the x-axis after being redirected by the first reflective surface. A second reflective surface is affixed to a first guide component. The second reflective surface is operably positioned to redirect the laser beam so that the laser beam travels substantially along the y-axis after being redirected by the second reflective surface.

The first guide component is operably connected to an x-axis guide shaft for movement therealong. The x-axis guide shaft is formed from polished stainless steel. A first wear compensating bearing is affixed to the first guide component and contacts the x-axis guide shaft such that the first wear compensating bearing is operative to allow relative movement between the first guide component and the x-axis guide shaft. The first wear compensating bearing has a first end and a second end. The first end of the first wear compensating bearing includes a groove. The first wear compensating bearing has at least one aperture which is elongate in shape and is shorter than the first wear compensating bearing. The aperture has a first end and a second end with the first end of the aperture being flush with the first end of the first wear compensating bearing. Such aperture may be a slot.

A first spring means is sized to fit in the groove of the first wear compensating bearing and is designed to maintain the first self-wearing bearing in centered operative contact with the x-axis guide shaft. The first guide component is operably connected to an x-axis ball screw. The x-axis ball screw is operably connected to a first stepper motor which is operative to actuate the x-axis ball screw, whereby actuation of the x-axis ball screw actuates the first guide component in the x-direction.

A third reflective surface is affixed to a second guide component and is operably positioned to redirect the laser beam so that the laser beam travels substantially along the z-axis after being redirected by the third reflective surface. A y-axis guide shaft is affixed to the first guide component, while the second guide component is operably connected to the y-axis guide shaft for movement therealong. The y-axis guide shaft is formed from polished stainless steel.

A second wear compensating bearing is affixed to the second guide component and contacts the y-axis guide shaft. The second wear compensating bearing is operative to allow relative movement between the second guide component and the y-axis guide shaft. The second wear compensating bearing has a first end and a second end. The first end of the second wear compensating bearing has a groove. The second wear compensating bearing includes at least one aperture. The aperture, such as a slot is elongate in shape and is shorter than the second wear compensating bearing. The aperture has a first end and a second end with the first end of the aperture being flush with the first end of the second wear compensating bearing.

A second spring means is sized to fit in the groove of the second wear compensating bearing and is designed to maintain the second self-wearing bearing in centered operative contact with the y-axis guide shaft. A y-axis ball screw is affixed to the first guide component and the second guide component is operably connected to the y-axis ball screw. A second stepper motor is operably connected to the y-axis ball screw and is operative to actuate the y-axis ball screw, whereby actuation of the y-axis ball screw actuates the second guide component in the y-direction.

The invention, in another form thereof, comprises a method of guiding a marking laser. The method of this form of the current invention includes the steps of: providing a laser source, providing an x-y axis guiding mechanism, and operatively positioning the laser source whereby a laser beam produced by the laser source will be guided by the x-y axis guiding mechanism.

In one form of the current invention, the step of providing an x-y axis guiding mechanism further includes the steps of: providing a first reflective surface, positioning the first reflective surface whereby a laser beam from the laser source will travel substantially along the z-axis and contact the first reflective surface and the laser beam will travel substantially along the x-axis after contacting the first reflective surface, providing a second reflective surface, positioning the second reflective surface so that the laser beam will contact the second reflective surface and the laser beam will travel substantially along the y-axis after contacting the second reflective surface, providing a third reflective surface, positioning the third reflective surface so that the laser beam will contact the third reflective surface and the laser beam will travel substantially along the z-axis after contacting the third reflective surface. In one form of the current invention, the method of guiding a marking laser further includes the steps of: moving the second reflective surface and the third reflective surface in unison along the x-axis and moving the third reflective surface along the y-axis.

An advantage of the present invention is the ability to provide a low cost precision guiding apparatus for a laser marking device. The new invention reduces the requirement for high cost, high tolerance parts.

Another advantage of the present invention is the ability to provide precision guiding with an x-y axis guiding system without having to continually replace bearings.

A further advantage of the present invention is the ability to achieve the required precision for a laser marking device while utilizing an x-y axis guiding apparatus.

Yet another advantage of the present invention is the ability to provide a self-wear compensating bearing which when utilized with an x-y axis guiding system, supplies the required precision for laser guiding.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
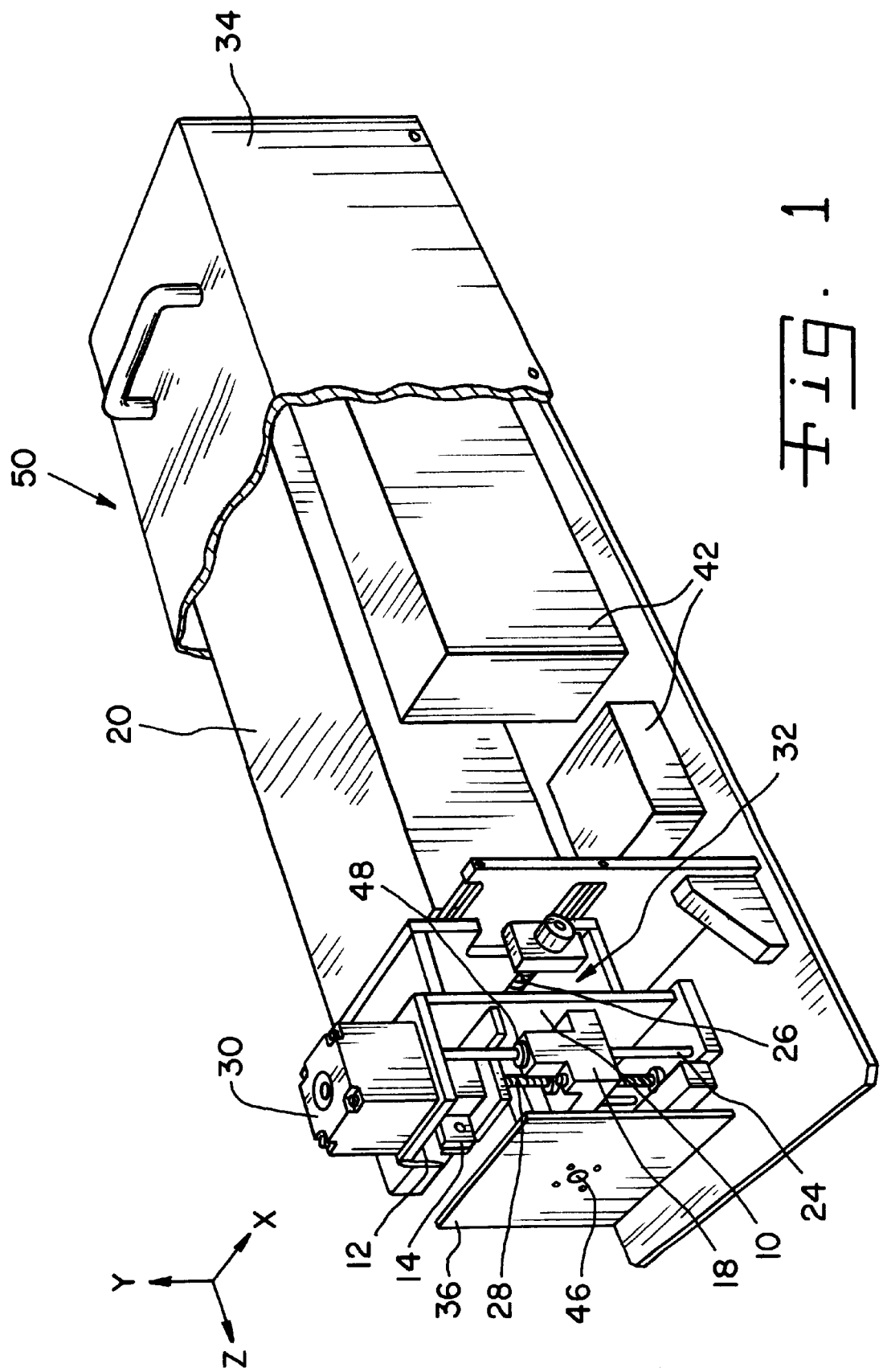
FIG. 1 is a partial cut-away perspective view of a laser marking device of the current invention.

Referring now to the drawings and particularly to FIG. 1, laser marking device 50 includes laser source 20 and x-y axis guiding apparatus 32. Control circuitry 42 is operatively connected to a computational device (not shown) and controls x-y axis guiding apparatus 32.

Figure 2:
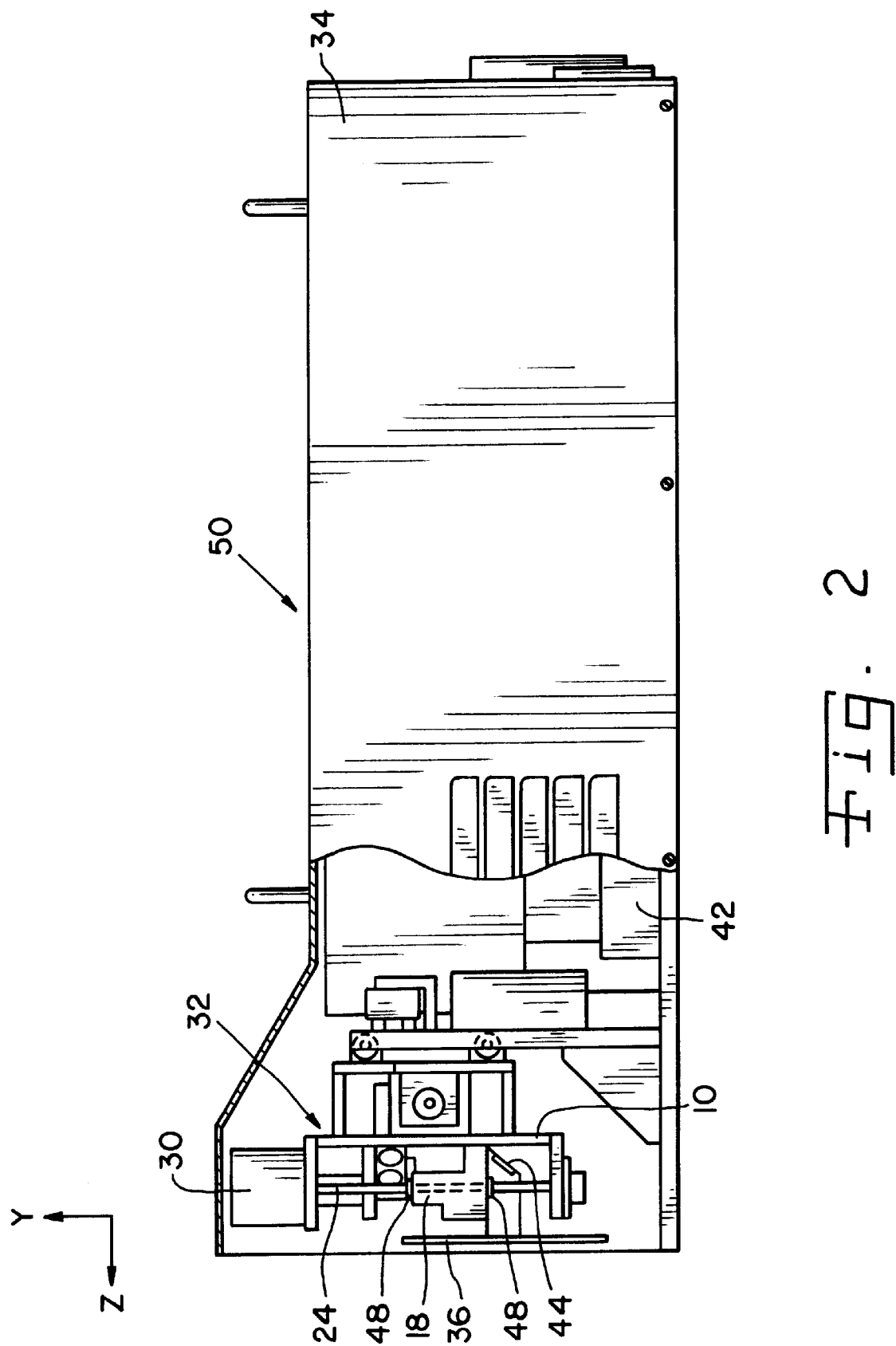
FIG. 2 is a partial cut-away side elevational view of a laser marking device of the current invention.

Laser source 20 produces a laser beam which exits laser source 20 and contacts first reflective surface 12. The laser beam produced by laser source 20 travels in the z-direction as it exits laser source 20. The beam then travels in the x-direction as it is redirected by first reflective surface 12. After contacting first reflective surface 12, the laser beam contacts second reflective surface 14 and is redirected in the y-direction. Third reflective surface 44 (FIG. 2) is operatively positioned to redirect the laser beam after the beam exits second reflective surface 14. The laser beam travels in the z-direction after contacting third reflective surface 44. After contacting third reflective surface 44, the laser beam exits through aperture 46 (FIG. 1) of protection plate 36.

Second reflective surface 14 and third reflective surface 44 are operatively connected to first guide component 10 such that movement of first guide component 10 along the x-axis simultaneously moves both second reflective surface 14 and third reflective surface 44 in the x-direction.

Figure 3:
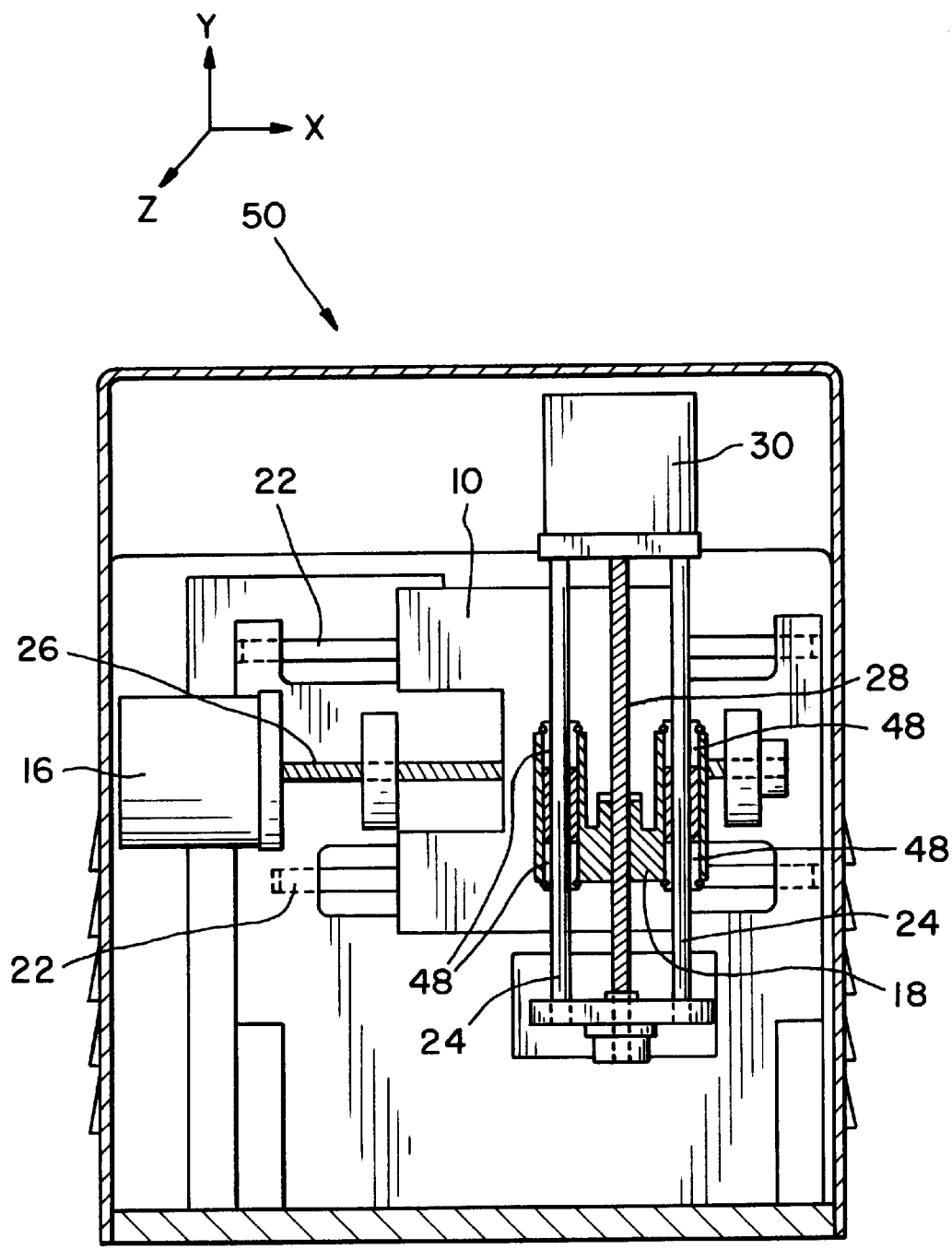
FIG. 3 is a partial sectional end elevational view of a laser marking device of the current invention.

As illustrated in FIG. 3, first guide component 10 is operatively connected to x-axis guide shafts 22. First guide component 10 is further operatively connected to x-axis ball screw 26. X-axis ball screw 26 is connected to first stepper motor 16, which is connected to control circuitry 42. First stepper motor 16 is operative to actuate x-axis ball screw 26, which produces movement of first guide component 10 in the x-direction.

Second guide component 18 is operatively connected to y-axis guide shafts 24 and to y-axis ball screw 28. Y-axis ball screw 28 is operatively connected to second stepper motor 30, which is communicatively connected to control circuitry 42. Second stepper motor 30 is operative to actuate y-axis ball screw 28, which produces motion of second guide component 18 in the y-direction.

Figure 5:
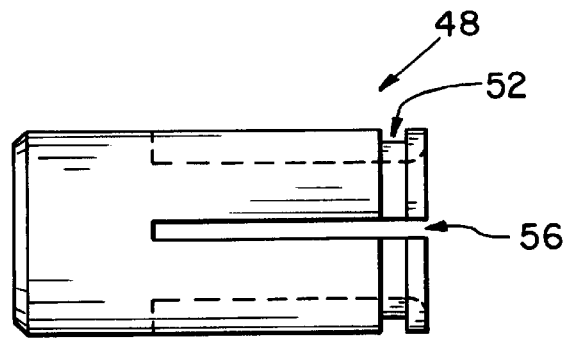
FIG. 5 is a side elevational view of a wear compensating bearing of the current invention.
Figure 4:
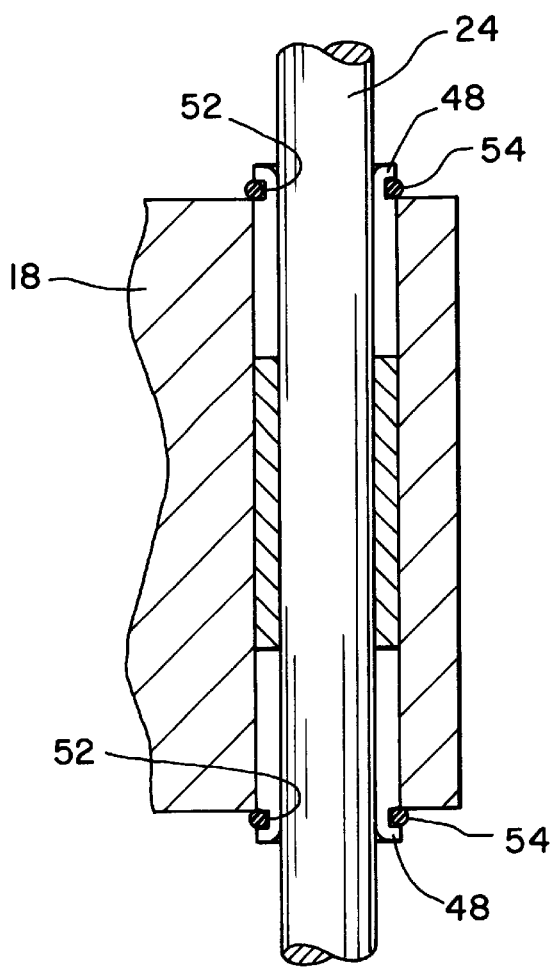
FIG. 4 is a sectional view of a portion of the x-y axis guiding apparatus in accordance with the current invention.

Bearings 48 are provided between first guide component 10 and x-axis guide shafts 22 as well as between second guide component 18 and y-axis guide shafts 24. FIG. 4 illustrates bearings 48 in operative relationship with y-axis guide shaft 24 and second guide component 18. A similar configuration is utilized with x-axis guide shafts 24 and first guide component 10. As illustrated, bearings 48 include groove 52 into which annular spring 54 is placed. As illustrated in FIG. 5, bearings 48 include at least one elongate aperture or slot 56.

In operation, control circuitry 42 is operatively connected to a computational device (not shown) which is utilized to control the marking activity of laser marking device 50. First guide component 10 is utilized to move both second reflective surface 14 and third reflective surface 44 in the x-direction to control the markings created by laser marking device 50 in the x-direction. Similarly, second guide component 18 is utilized to reposition third reflective surface 44 in the y-direction to control the markings created by laser marking device 50 in the y-direction. In this way, the combined movement of first guide component 10 and second guide component 18 produces the desired movement of the laser beam created by laser marking device 50 and thus, creates the desired mark. First stepper motor 16 is utilized to move first guide component 10 along the x-axis, while second stepper motor 30 is utilized to move second guide component 18 along the y-axis. Annular spring 54 is placed in tension and keeps bearings 48 in operative relationship with the guide shaft along which they are mounted. Tension adjusting means may be utilized to provide the desired tension when annular spring 54 is applied and during operation. As bearings 48 wear, annular springs 54 maintain bearings 48 in operative contact with the relevant guide shafts as allowed by apertures 56 (as bearings 48 wear, the sides of apertures 56 are brought closer together as the tension in O-rings 54 maintain bearings 48 in central operative contact with the relevant guide shafts). In this way, the gaps between the bearings and the guide components which occur as bearings 48 wear is taken up and the required precision of laser marking device 50 is maintained.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A laser marking apparatus for marking a workpiece, the laser beam being operable to travel in a coordinate system including an x-axis, a y-axis, and a z-axis, said apparatus comprising:

a laser source, said laser source being operative to produce a laser beam traveling substantially along the z-axis from said laser source; and an x-y axis guiding apparatus for guiding said laser beam, said x-y axis guiding apparatus being moveable along the x-axis and the y-axis, said x-y axis guiding apparatus includes an x-axis guide shaft, y-axis guide shaft, a first guide component operable connected to said x-axis guide shaft for movement therealong, a second guide component operably connected to said y-axis guide shaft for movement therealong, a first bearing positioned and operative to allow relative movement between said x-axis guide shaft and said first guide component, a second bearing positioned and operative to allow relative movement between said y-axis guide shaft and said second guide component, a first biasing means operatively connected to said first bearing, whereby said first biasing means is operative to maintain said first bearing in operative relationship with said x-axis guide shaft while said first bearing maintains its operative relationship with said first guide component, and a second biasing means operatively connected to said second bearing, whereby said second biasing means is operative maintain said second bearing in operative relationship with said y-axis guide shaft while said second bearing maintains its operative relationship with said second guide component.

2. The laser marking apparatus as recited in claim 1, wherein said laser source is a $CO_2$ laser source.

3. The laser marking apparatus as recited in claim 1, wherein said x-y axis guiding apparatus comprises:

a first reflective surface, said first reflective surface being operably positioned to redirect said laser beam, whereby said laser beam travels substantially along the x-axis after being redirected by said first reflective surface;

a second reflective surface, said second reflective surface being operably positioned to redirect said laser beam, whereby said laser beam travels substantially along the y-axis after being redirected by said second reflective surface; and a third reflective surface, said third reflective surface being operably positioned to redirect said laser beam, whereby said laser beam travels substantially along the z-axis after being redirected by said third reflective surface.

4. The laser marking apparatus as recited in claim 1, wherein said x-axis guide shaft comprises polished stainless steel shafts.

5. The laser marking apparatus as recited in claim 1, wherein said y-axis guide shaft comprises polished stainless steel shafts.

6. The laser marking apparatus as recited in claim 1, wherein said x-y axis guiding apparatus further comprises:

an x-axis actuator; and a y-axis actuator.

7. The laser marking apparatus as recited in claim 6, wherein said x-y axis guiding apparatus further comprises:

a first guide component, said second reflective surface affixed to said first guide component, said first guide component operably connected to said x-axis guide shaft for movement therealong, said first guide component operably connected to said x-axis actuator; and a second guide component, said third reflective surface affixed to said second guide component, said second guide component operably connected to said y-axis guide shaft for movement therealong, said y-axis guide shaft affixed to said first guide component, said second guide component operably connected to said y-axis actuator.

8. The laser marking apparatus as recited in claim 7, wherein said x-y axis guiding apparatus further comprises:

said second reflective surface affixed to said first guide component, said first guide component operably connected to said x-axis actuator; and said third reflective surface affixed to said second guide component, said y-axis guide shaft affixed to said first guide component, said second guide component operably connected to said y-axis actuator.

9. The laser marking apparatus as recited in claim 8, wherein said y-axis actuator comprises a y-axis ball screw, said y-axis ball screw being substantially parallel to said y-axis guide shaft, said y-axis ball screw affixed to said first guide component.

10. The laser marking apparatus as recited in claim 9, wherein said x-y axis guiding apparatus further comprises:

a first drive means, said first drive means operably connected to said x-axis ball screw, said first drive means operative to actuate said x-axis ball screw, whereby actuation of said x-axis ball screw actuates said first guide component in the x-direction; and a second drive means, said second drive means operably connected to said y-axis ball screw, said second drive means operative to actuate said y-axis ball screw, whereby actuation of said y-axis ball screw actuates said second guide component in the y-direction.

11. The laser marking apparatus as recited in claim 10, wherein said first drive means comprises a first stepper motor.

12. The laser marking apparatus as recited in claim 11, wherein said second drive means comprises a second stepper motor.

13. The laser marking apparatus as recited in claim 12, wherein said x-y axis guiding apparatus further comprises:

a computational device, said computational device communicatively connected to said first stepper motor and said second stepper motor, said computational device being operative to control said first stepper motor and said second stepper motor, whereby said computational device is operative to control the markings made by said laser.

14. The laser marking apparatus as recited in claim 1, wherein said first biasing means comprises an annular spring.

15. The laser marking apparatus as recited in claim 14, wherein said second biasing means comprises an annular spring.

16. A laser marking apparatus for marking a workpiece with a laser beam, the laser beam being operable to travel in a coordinate system including an x-axis, a y-axis, and a z-axis, said apparatus comprising:

a laser source, said laser source being operative to produce a $CO_2$ laser beam traveling substantially along the z-axis from said laser source;

a first reflective surface, said first reflective surface being operably positioned to redirect said laser beam, whereby said laser beam travels substantially along the x-axis after being redirected by said first reflective surface;

a first guide component;

a second reflective surface, said second reflective surface affixed to said first guide component, said second reflective surface being operably positioned to redirect said laser beam, whereby said laser beam travels substantially along the y-axis after being redirected by said second reflective surface;

an x-axis guide shaft, said x-axis guide shaft being formed from polished stainless steel, said first guide component being operably connected to said x-axis guide shaft for movement therealong;

a first wear compensating bearing, said first wear compensating bearing affixed to said first guide component, said first wear compensating bearing contacting said x-axis guide shaft, whereby said first wear compensating bearing is operative to allow relative movement between said first guide component and said x-axis guide shaft, said first wear compensating bearing having a first end and a second end, said first end of said first wear compensating bearing having a groove, said first wear compensating bearing having at least one aperture, said at least one aperture being elongate in shape, said at least one aperture being shorter than said first wear compensating bearing, said at least one aperture having a first end and a second end, said first end of said aperture being flush with said first end of said first wear compensating bearing;

a first spring means, said first spring means being sized to fit in said groove, whereby said first spring means maintains said first self-wearing bearing in operative contact with said x-axis guide shaft;

an x-axis ball screw, said first guide component operably connected to said x-axis ball screw;

a first stepper motor, said first stepper motor operably connected to said x-axis ball screw, said first stepper motor being operative to actuate said x-axis ball screw, whereby actuation of said x-axis ball screw actuates said first guide component in the x-direction;

a second guide component;

a third reflective surface, said third reflective surface affixed to said second guide component, said third reflective surface being operably positioned to redirect said laser beam, whereby said laser beam travels substantially along the z-axis after being redirected by said third reflective surface;

a y-axis guide shaft, said y-axis guide shaft being formed from polished stainless steel, said y-axis guide shaft affixed to said first guide component, said second guide component being operably connected to said y-axis guide shaft for movement therealong;

a second wear compensating bearing, said second wear compensating bearing affixed to said second guide component, said second wear compensating bearing contacting said y-axis guide shaft, whereby said second wear compensating bearing is operative to allow relative movement between said second guide component and said y-axis guide shaft, said second wear compensating bearing having a first end and a second end, said first end of said second wear compensating bearing having a groove, said second wear compensating bearing having at least one aperture, said at least one aperture being elongate in shape, said at least one aperture being shorter than said second wear compensating bearing, said at least one aperture having a first end and a second end, said first end of said aperture being flush with said first end of said second wear compensating bearing;

a second spring means, said second spring means being sized to fit in said groove of said second wear compensating bearing, whereby said second spring means maintains said second self-wearing bearing in operative contact with said y-axis guide shaft;

a y-axis ball screw, said y-axis ball screw affixed to said first guide component, said second guide component operably connected to said y-axis ball screw; and a second stepper motor, said second stepper motor operably connected to said y-axis ball screw, said second stepper motor operative to actuate said y-axis ball screw, whereby actuation of said y-axis ball screw actuates said second guide component in the y-direction.

* * * * *